June 18, 1957     J. D. TALLANT     2,796,572
ELECTRIC MOTOR REGULATOR
Filed Jan. 27, 1955

INVENTOR
JOHN D. TALLANT

BY
R. Hoffman
ATTORNEY

United States Patent Office 2,796,572
Patented June 18, 1957

2,796,572

ELECTRIC MOTOR REGULATOR

John D. Tallant, New Orleans, La.

Application January 27, 1955, Serial No. 484,596

1 Claim. (Cl. 318—302)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the regulation of the speed of electric motors which are controlled by an external variable impedance. More particularly the invention provides a method and system for improving the speed-load characteristics of series wound commutator motors, such as used on sewing machines, by means of a novel eddy-current braking system.

Motors controlled by external impedances, such as variable resistances or variable transformers, are characterized by wide variations in speed for small changes in load. An object of the present invention, therefore, is to provide a method of improving the speed-load characteristics of electric motors, which are controlled by an external variable impedance, without adding to the starting load or reducing the maximum speed of the motor. A further object is to provide such a method which is adapted for use on A. C., D. C. or universal motors. A still further object is to provide an electric circuit comprising a source of power, a motor, an external variable impedance, and an electromagnetic brake which is particularly effective over the slow to intermediate speed ranges of the motor. Other objects will become apparent from the description below.

The above objects are accomplished by the use of an electromagnetic brake, in which the electromagnet is connected in parallel with that portion of the external impedance which is in series with the motor, and by providing a non-magnetic conductor, mechanically connected to the motor, so arranged as to rotate in the field produced by the electromagnet.

In order that the invention may be fully understood, reference is made to the following description and to the accompanying drawings in which like reference numerals designate like parts.

In the drawing.

In each figure the same reference numerals have been applied to corresponding circuit elements.

Figure 1:
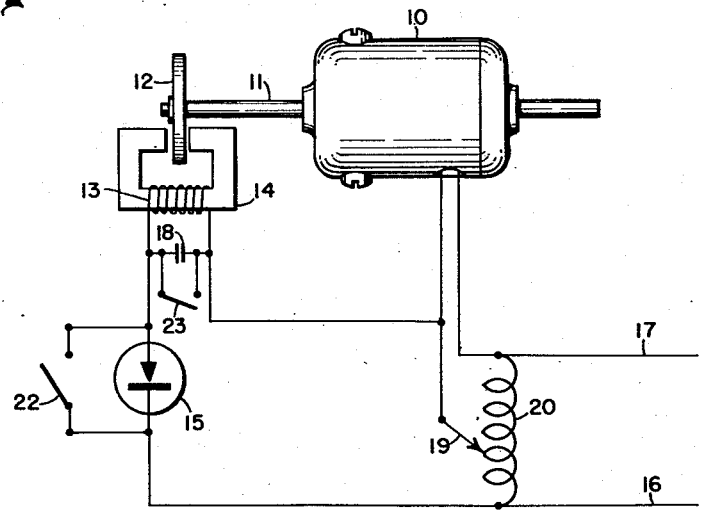
Figure 1 is a diagrammatic illustration showing a circuit for a motor controlled by an external variable transformer and provided with the electromagnet brake.

In the circuit shown in Figure 1, motor 10 is mechanically connected, by means of shaft 11, to non-magnetic metallic disc 12. Disc 12 is arranged to rotate through the field of magnetic lines of force emanating from electromagnet coil 13 and concentrated by core 14. As shown in the two figures, electromagnetic core 14 is stationary. Rectifier 15, used with an A. C. source of power, is arranged to allow current from motor power supply lines 16 and 17 to flow through electromagnet 13. Capacitor 18 is connected in parallel with solenoid 13, to prevent arcing when alternating current is used. Variable contact 19 is arranged to connect motor 10 in series, and electromagnet 13 is parallel, with various portions of transformer coil 20.

Figure 2:
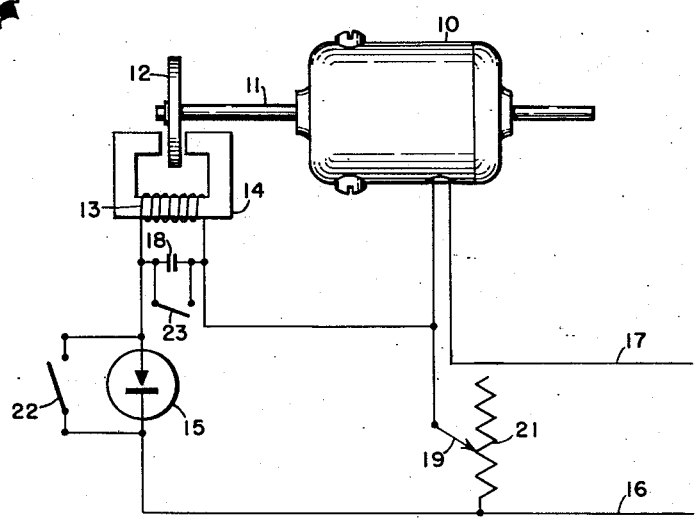
Figure 2 illustrates a similar circuit for a motor controlled by an external variable resistance.

In the similar circuit shown in Figure 2 transformer coil 20 has been replaced by resistance 21.

Substantially any external variable impedance arranged to place various amounts of impedance in series with the motor can suitably be used in the circuits provided by this invention.

When using a D. C. source of power rectifier 15 is removed from the circuit by means of short circuiting switch 22 and capacitator is removed by means of switch 23.

The electromagnetic brake, diagrammatically illustrated by electromagnet 13 and non-magnetic metallic disc 12, is preferably an eddy current coupling or drive unit in which the magnetic lines of force emanate from stationary core 14 and flow through a rotatable non-magnetic conductor 12. The lines of force produced by the electromagnet can be supplemented by or reduced by permanent magnets or electromagnets activated by a different source of power. The dimensions of the electromagnetic brake are preferably such that the force required to rotate the non-magnetic conductor is small in comparison with the inertia of the motor armature.

The power supplied to the coil of the electromagnetic brake can be any desired function of the voltage drop across the portion of the impedance in series with the motor. The rate at which the motor drives the non-magnetic conductor through the magnetic lines of force can be any desired function of the speed of the motor. In general, direct connection to the motor shaft is preferred.

In a practical application, the above-described system is applied to the operation of a sewing machine motor. Such motors, which are usually series-wound, commutator type motors characteristically tend to race when power is applied under no-load conditions. In the present system, because the electromagnet is in parallel with that portion of the variable impedance which is in series with the motor, the magnetic field will be some function of the voltage applied to the motor. Since the force required to rotate the non-magnetic disc through the magnetic field increases with the square of the speed of rotation, it is evident that a counter-torque is set up which has a braking effect on the tendency of the motor to race. However, when the external impedance is set for maximum speed for the actual sewing operation by cutting out all or most of the impedance, the electromagnet is itself completely or substantially completely cut out. The full power of the motor can then be applied to operating the sewing machine without the imposition of additional load from the brake, thus making it possible to utilize the maximum speed of the motor.

I claim:

A system for controlling the speed of electric motors which comprises, in combination, a source of electric current; an electric motor; a variable impedance connected in series with said source of electric current and said motor; an electromagnet having a stationary core connected in parallel with the portion of said variable impedance which is in series with the motor; and braking means for applying a torque to said motor in opposition to its rotation comprising a non-magnetic metallic disc mechanically connected to the motor and adapted to rotate in the field of the electromagnet.

References Cited in the file of this patent

UNITED STATES PATENTS

| 2,351,508 | Hamilton | June 13, 1944 |
| 2,421,187 | Derungs | May 27, 1947 |